Dec. 19, 1950     G. M. DEMING ET AL     2,534,959
OXYGEN REGULATOR
Filed Feb. 26, 1947     6 Sheets-Sheet 2
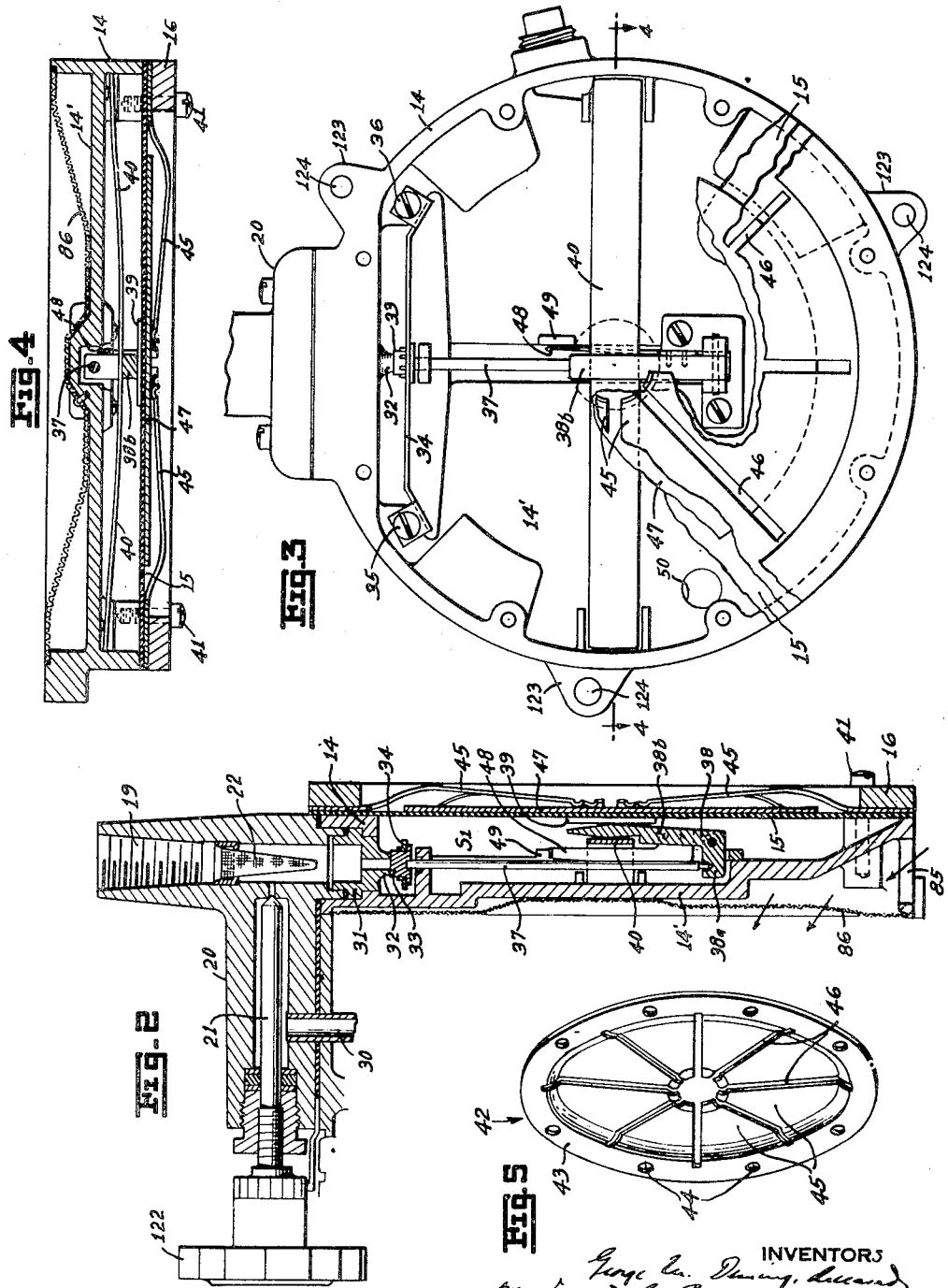
INVENTORS

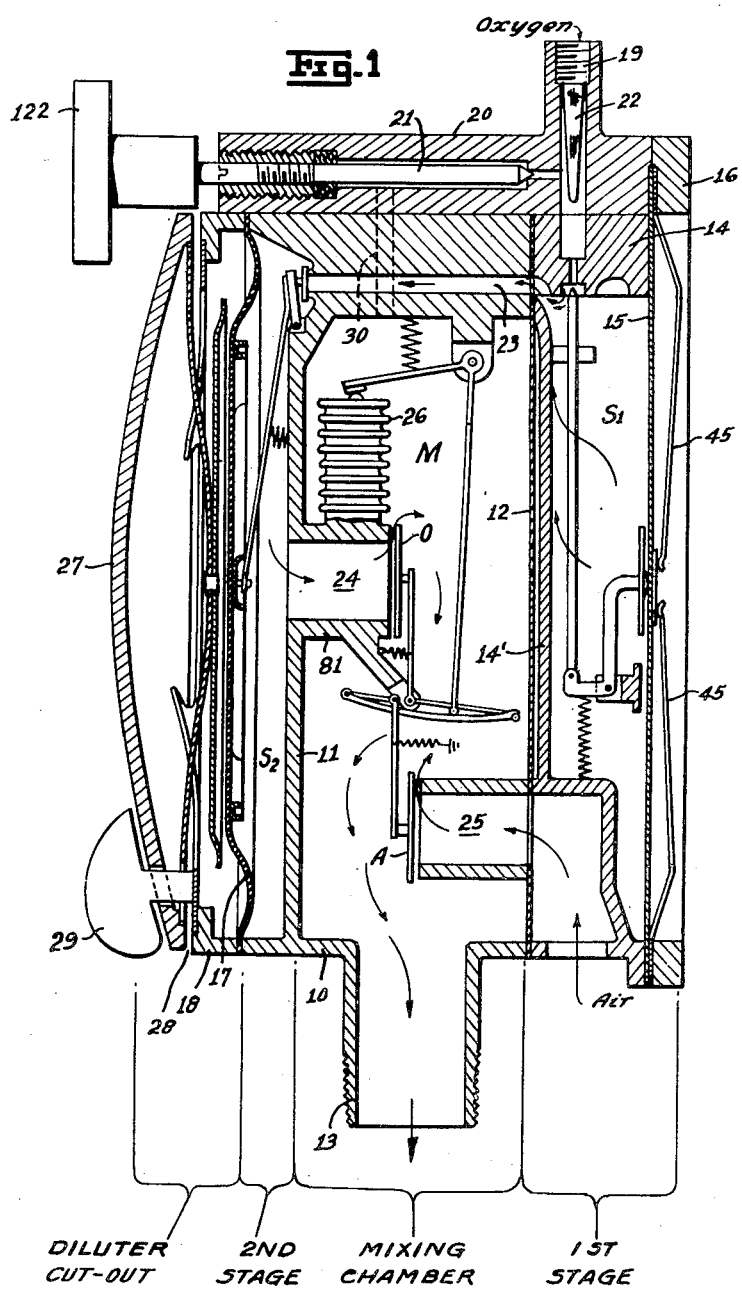

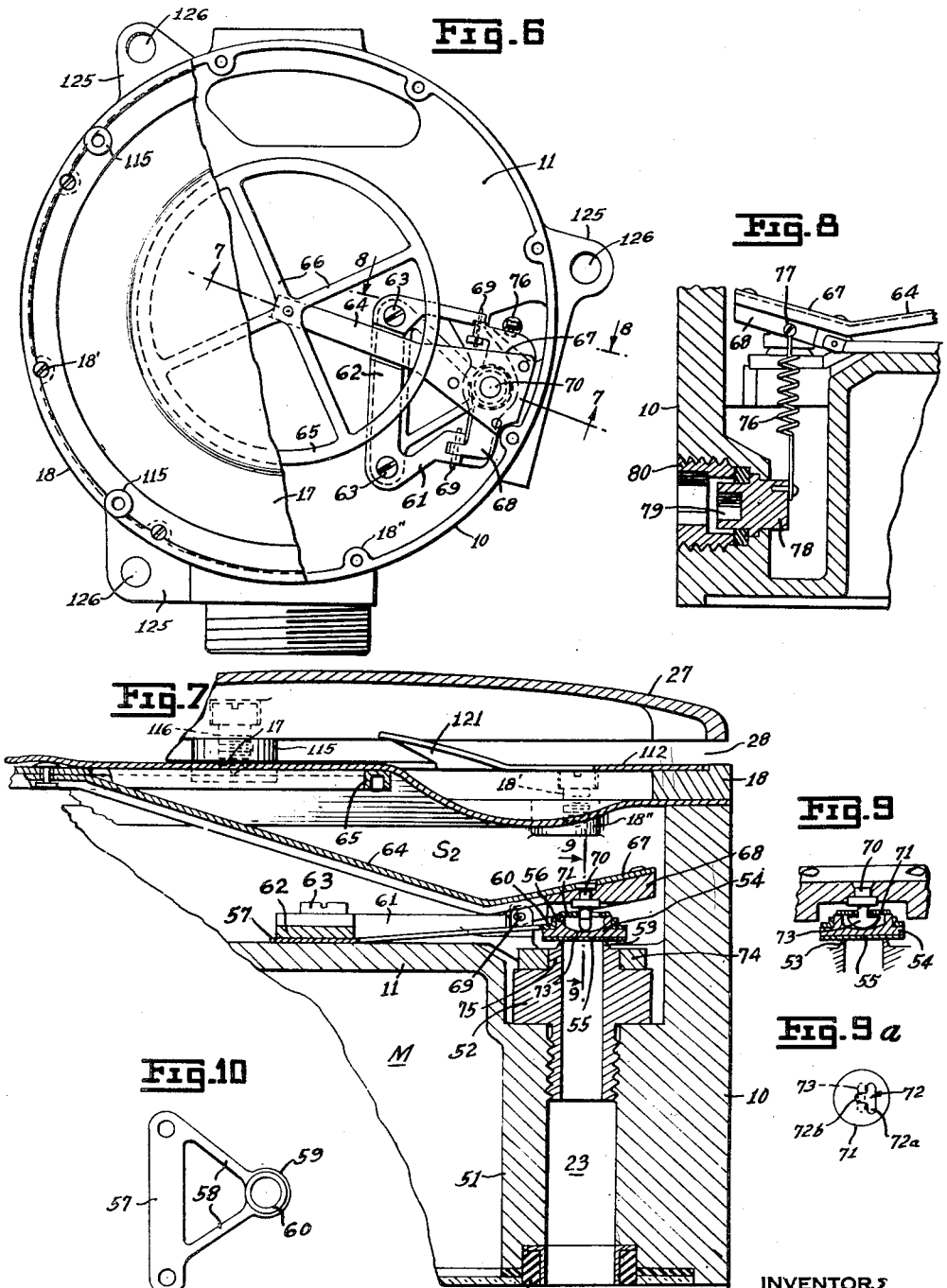

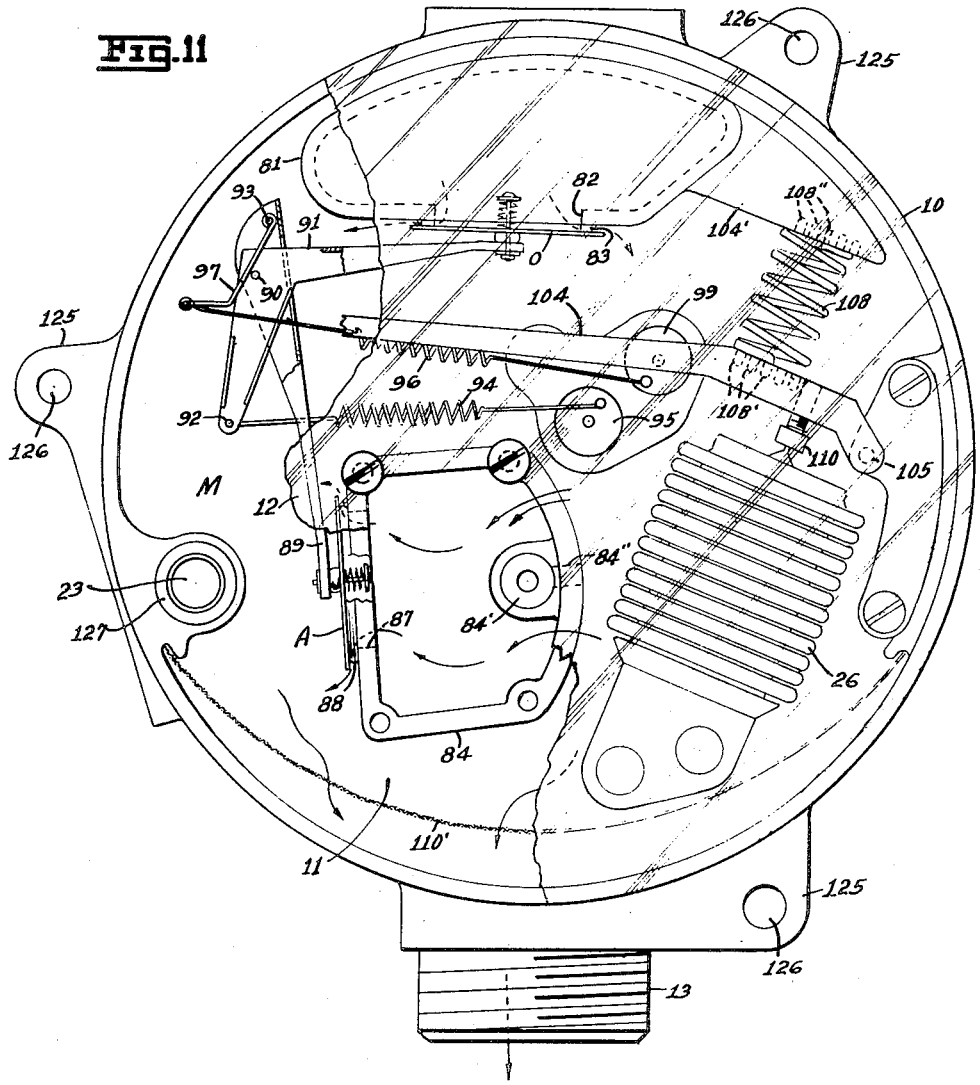

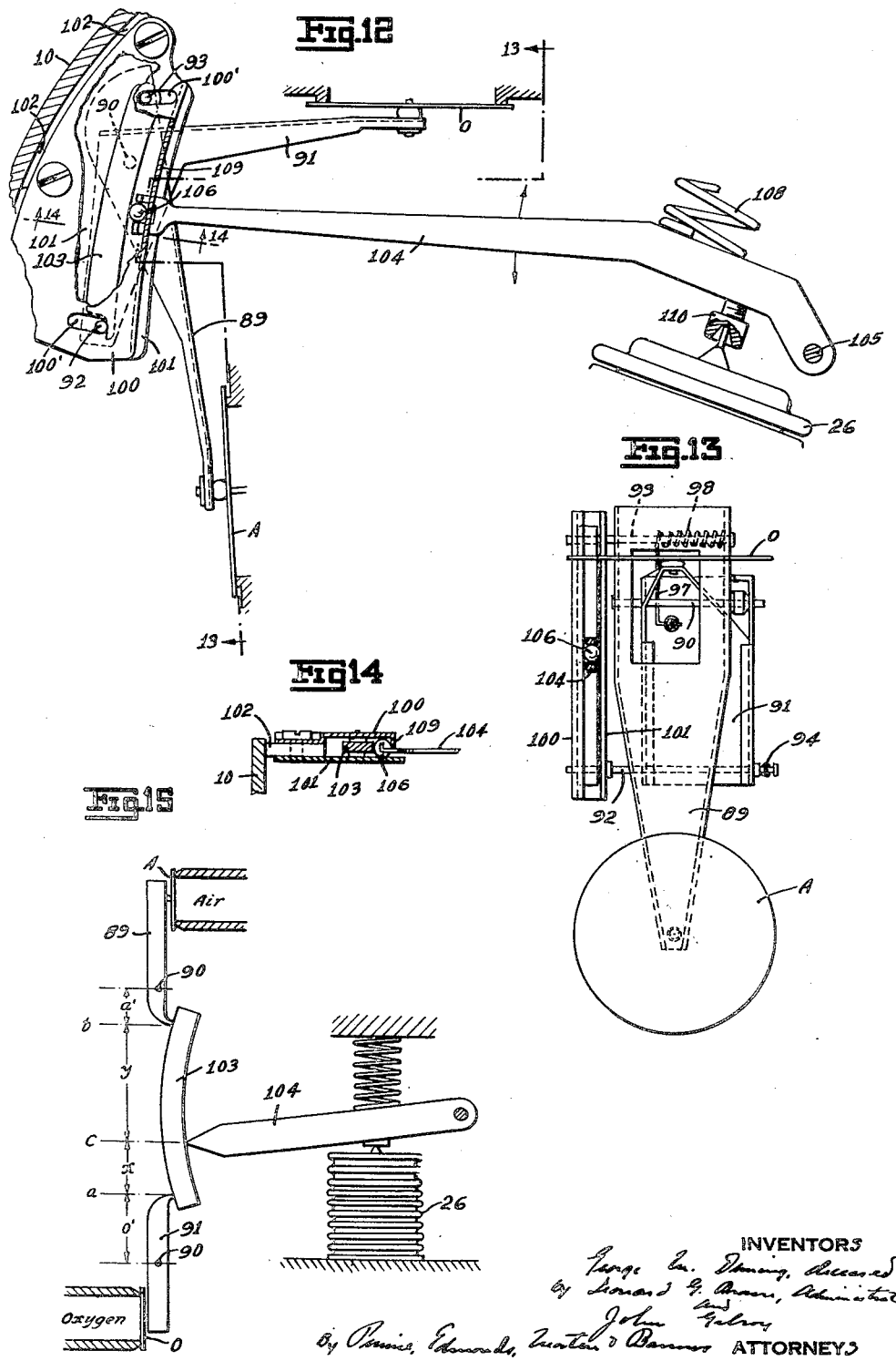

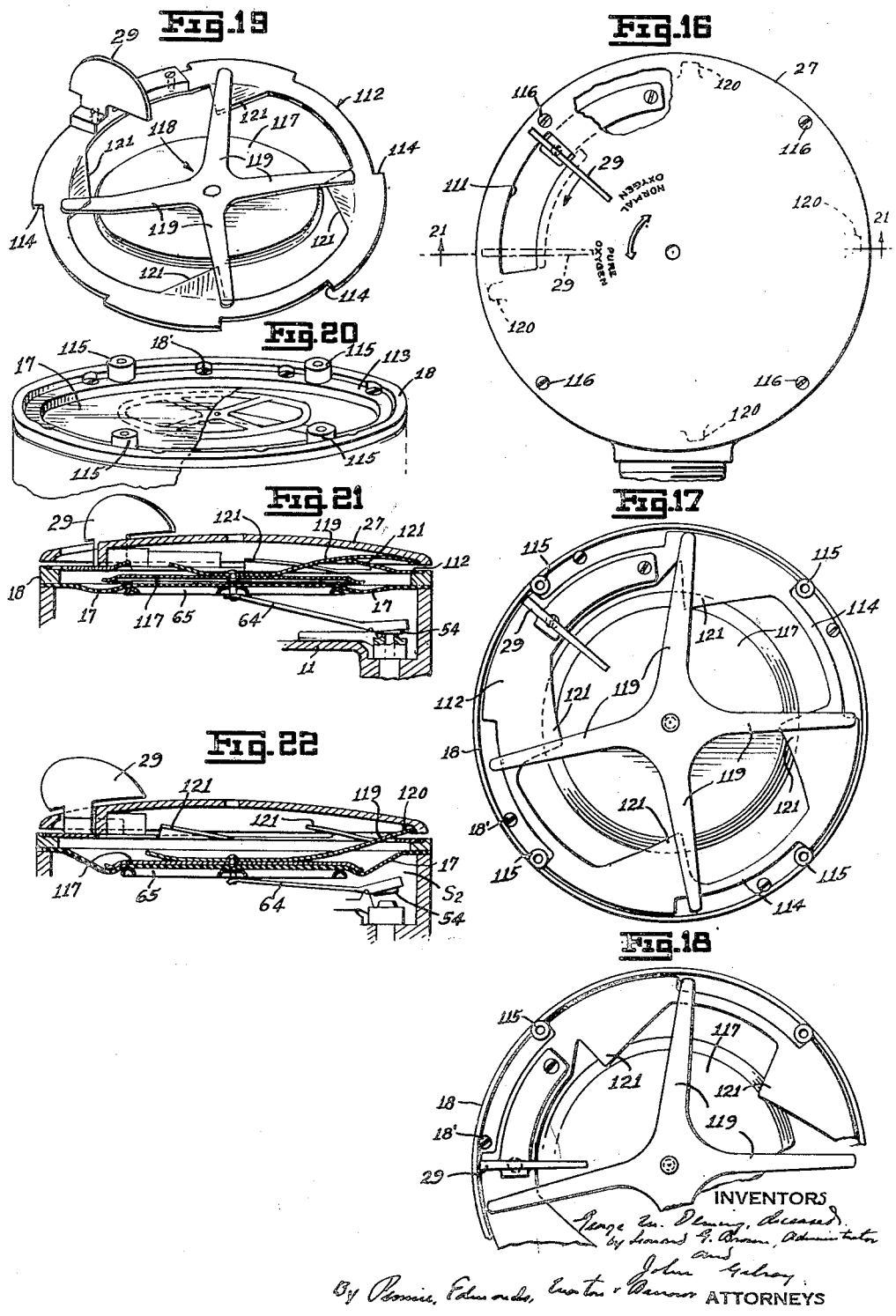

Patented Dec. 19, 1950

2,534,959

UNITED STATES PATENT OFFICE 2,534,959

OXYGEN REGULATOR

George M. Deming, deceased, late of Orange, N. J., by Leonard G. Brown, administrator, South Orange, and John Gilroy, Westfield, N. J., assignors to Air Reduction Company, Incorporated, a corporation of New York Application February 26, 1947, Serial No. 731,133

34 Claims. (Cl. 128—142)

This invention relates to improvements in oxygen regulators of the kind disclosed in the patent to G. M. Deming No. 2,403,508, issued July 9, 1946.

The oxygen regulator disclosed in the Deming patent is a demand type regulator intended primarily for use in connection with aircraft breathing apparatus. It has two stages of pressure reducing mechanism for the incoming oxygen. An oxygen regulating valve admits oxygen from a relatively high pressure source to the first-stage oxygen chamber and is controlled by a diaphragm forming one wall of this chamber. A second-stage regulating valve, sometimes referred to as the demand valve, is controlled by a second diaphragm exposed at its outer side to atmospheric pressure and admits oxygen from the first-stage oxygen chamber to the second-stage oxygen chamber and maintains therein a supply of oxygen at a pressure which is always substantially the same as the atmospheric pressure at the flight altitude. The oxygen passes from the second-stage chamber through a port into a respiratory chamber, or mixing chamber, communicating with the breathing mask. Outside air is admitted to the mixing chamber through a second port. The oxygen and air ports leading into the mixing chamber are controlled by oxygen-proportioning and air-proportioning valves mounted on a common pivoted lever which is controlled by an aneroid bellows so that the oxygen concentration breathed by the aviator is varied automatically in accordance with altitude requirements. The regulator supplies air with no oxygen enrichment at sea level and for relatively low altitudes up to say 5,000 feet, and a mixture of oxygen and air from that altitude up to say 33,000 feet, the concentration of oxygen gradually increasing as the flight altitude becomes higher. Around 33,000 feet the air-proportioning valve fully closes so that at this altitude and higher altitudes only oxygen is breathed by the aviator. The altitude at which oxygen must first be added wi'l be referred to herein as the "oxygen cut-in altitude" and the altitude above which only oxygen is supplied to the aviator will be referred to herein as the "air cut-out altitude."

Since the air-proportioning and oxygen-proportioning valves in the regulator above described are mounted on a common lever which is adjusted by an aneroid bellows to gradually close the air-proportioning valve and gradually open the oxygen-proportioning valve as the flight altitude increases, each valve has a fixed degree of opening for every altitude between the oxygen cut-in altitude and the air cut-out altitude. While such an arrangement is satisfactory where the range of demand rates required of the regulator is relatively small, it is not entirely satisfactory at relatively high demand rates, i. e. when the aviator breathes unusually fast or unusually deep. This is due to the fact that, other things being equal, the pressure differential across the valves increases as the square of the flow, and a degree of opening of the valves which is proper at a given altitude for normal demand rates therefore causes very large pressure differentials at relatively large demand rates. It is desirable for an oxygen regulator to operate satisfactorily for a flow range of the order of 60:1. For such a flow range, the range of pressure differentials in a regulator of the kind above described would be 3600:1, an impracticably high ratio.

The flow limitations imposed upon the method of air and oxygen proportioning employed in a regulator of the type above described may be avoided if the orifices of the air and oxygen-proportioning valves are elastically responsive to the suction in the mixing chamber; in other words, if the air and oxygen-proportioning valves function somewhat like check valves. By this is meant that they are suction-opened and their displacements are proportionate to the suction in the respiratory chamber. The principal object of this invention is to provide an aircraft oxygen regulator in which the air and oxygen-proportioning valves operate in this manner and yet are so interlinked by altitude controlled mechanism that the displacement ratio of the two valves for any flight altitude between the oxygen cut-in altitude and the air cut-out altitude is proper, i. e. the oxygen valve opens the proper amount in relation to the amount the air valve opens to give the proper oxygen concentration in the mixture. Otherwise stated, the principal object of the invention is to provide an aircraft oxygen regulator which will operate satisfactorily over a wide flow range such as a range of the order of 60:1.

Among other objects of the invention are to improve in general the construction and operation of an oxygen regulator of the type shown in the above-mentioned Deming patent; to improve the construction and operation of the oxygen-proportioning and air-proportioning valves and the mechanism associated with them so that for every altitude during flight there will be the proper proportions of air and oxygen in the gas breathed by the aviator regardless of the flow rate, i. e. regardless of variations in the suction created in the mixing chamber by variations in the depth or rate of breathing by the aviator; to improve the construction and operation of the first-stage pressure reducing mechanism for the oxygen, particularly as to the spring mechanism for loading the first-stage diaphragm; to improve the construction and operation of the oxygen demand valve and its associated parts; to provide improved means for adjusting the spring tension which yieldingly opposes the opening of the oxygen demand valve; to provide improved means under the manual control of the aviator for causing the oxygen regulator to function without dilution of the oxygen by air regardless of altitude so that oxygen only will be delivered to the breathing mask; to provide diluter cut-out mechanism of the kind last mentioned which, when thrown into operation, will not cause the regulator to cease operating on the demand principle; to provide certain improvements which are desirable and useful not only in an aircraft oxygen regulator of the kind above described but in other regulators as well; and in general, to provide a more satisfactory oxygen regulator.

While the improved oxygen regulator was designed primarily for aircraft use, some of the features of the invention are useful in connection with breathing apparatus for hospital and other uses as will hereinafter appear.

An oxygen regulator embodying the invention is illustrated in the accompanying drawings, in which:

Figure 1 is a diagrammatic representation in vertical section of the oxygen regulator, and Figures 2 to 22, inclusive, illustrate one form of the regulator as actually used;

Fig. 2 is a vertical transverse section through that portion of the regulator casing which contains the first-stage oxygen chamber;

Fig. 3 is an elevation or face view of the parts shown in Fig. 2 as viewed from the right side, a portion of the diaphragm loading spring and a portion of the diaphragm itself being broken away to expose the mechanism within the first-stage oxygen chamber;

Fig. 4 is a horizontal section taken on the line 4—4 of Fig. 3;

Fig. 5 is a perspective view of the cantilever-type spring employed for loading the diaphragm of the first-stage oxygen chamber;

Fig. 6 is an end elevation or face view of that portion of the regulator casing which contains the second-stage oxygen chamber as viewed from the left in Fig. 1, the parts outwardly of the diaphragm clamping ring being omitted and a portion of the diaphragm and its clamping ring being broken away to expose the mechanism within the second-stage oxygen chamber;

Fig. 7 is a vertical section through the oxygen demand valve taken on the line 7—7 of Fig. 6;

Fig. 8 is a vertical section taken on the line 8—8 of Fig. 6 showing the means for varying the spring tension on the oxygen demand valve;

Fig. 9 is a horizontal section taken on the line 9—9 of Fig. 7;

Fig. 9a is a top plan view of the cover plate on the demand valve element;

Fig. 10 is a plan view of the guide spring for the oxygen demand valve;

Fig. 11 is a face view of that portion of the regulator casing in which the mixing chamber is located, the portion of the casing which houses the first-stage oxygen chamber being removed to expose the parts within the mixing chamber;

Fig. 12 is a front elevation of the air-proportioning and oxygen-proportioning valves and the parts associated with them;

Fig. 13 is a vertical section taken on the line 13—13 of Fig. 12;

Fig. 14 is a transverse section taken on the line 14—14 of Fig. 12;

Fig. 15 is a diagrammatic explanatory view illustrating the principle of operation of the air-proportioning and oxygen-proportioning valves and their associated mechanism;

Fig. 16 is an elevation of the regulator looking toward the side face at which the handle for actuating the diluter cut-out mechanism is located;

Fig. 17 is a view corresponding to Fig. 16 with the side cover removed to expose the parts of the diluter cut-out mechanism, which in this figure are shown in the inoperative or "Normal oxygen" position;

Fig. 18 is a view corresponding to Fig. 17 showing the parts of the diluter cut-out mechanism in the operative or "Pure oxygen" position;

Fig. 19 is a perspective view showing the principal parts of the diluter cut-out mechanism removed from the casing;

Fig. 20 is a perspective view showing the portion of the casing in which the parts illustrated in Fig. 19 are supported and guided;

Fig. 21 shows the parts illustrated in Figs. 19 and 20 in assembled relation, this view being a section through the portion of the regulator casing that contains the diluter cut-out mechanism taken approximately on the line 21—21 of Fig. 16. The parts of the diluter cut-out mechanism are shown in this figure in the operative or "Normal oxygen" position; and Fig. 22 is a view corresponding to Fig. 21 showing the parts of the diluter cut-out mechanism moved to operative or "Pure oxygen" position.

The regulator will first be described in a general way by reference to the more or less diagrammatic representation of it in Fig. 1, and the general description will be followed by a more detailed description of the different parts of the regulator.

The regulator casing is divided into several sections detachably fastened together by bolts (not shown in Fig. 1). The main or intermediate portion of the casing 10 has an integral partition 11 to the right of which, as viewed in Fig. 1, is a chamber M. The right side of the chamber M, as viewed in Fig. 1, is closed by a separately formed partition 12 secured to the casing section 10. The chamber M constitutes the mixing chamber, a respiratory chamber, of the regulator. The breathing mask is connected to the mixing chamber in the usual way by means of a flexible hose connected to the threaded extension 13 on the casing section 10. A casing section 14 at the right of the casing section 10 has an integral inner wall 14' which lies adjacent the partition 12. The casing section 14 is closed at its right side by a diaphragm 15 clamped to the casing section by a clamping ring 16. The space between the diaphragm 15 and the inner wall 14' of the casing section 14 constitutes the first-stage pressure reduction chamber for the incoming oxygen and is designated $S_1$ on the drawing.

At the left of the partition 11 of the casing section 10 there is a relatively shallow chamber closed at its left side by a diaphragm 17 clamped to the casing section 10 by a clamping ring 18. This chamber constitutes the second-stage pressure reduction chamber for the oxygen and is designated $S_2$ on the drawing.

Oxygen from an oxygen cylinder, or other high pressure source, enters the oxygen regulator through an inlet 19 formed in a small casing section 20 which extends transversely of the other casing sections and houses the emergency by-pass valve 21. The oxygen passes through a screen 22 mounted in the casing section 20 and then passes through the wall of the casing section 14 into the first-stage pressure reduction chamber $S_1$, its admission to this chamber under reduced pressure being controlled by the diaphragm 15 and the valve mechanism hereinafter described. From the first-stage chamber $S_1$ the oxygen passes through a transverse passage 23 to the second-stage pressure reduction chamber $S_2$, the admission of oxygen to this chamber under further reduced pressure being controlled by the diaphragm 17 and the valve mechanism hereinafter described.

Oxygen enters the mixing chamber M from the second-stage chamber $S_2$ through a port 24 which is controlled by an oxygen-proportioning valve O. Air is admitted to the mixing chamber through a port 25 controlled by an air-proportioning valve A. These valves operate on the principle of check valves, i. e., they are biased to closed position by a spring and are suction-opened, the degree of opening of each valve being dependent upon the suction in the mixing chamber during inhalation periods. The two valves are interconnected by mechanical linkage and are controlled by an aneroid bellows 26 in such a way that whenever the air-proportioning valve opens at altitudes above the oxygen cut-in altitude it will force the oxygen-proportioning valve to open, but the displacement ratio of the two valves will depend upon the altitude. For altitudes up to the oxygen cut-in altitude only the air-proportioning valve opens. As the altitude increases between the oxygen cut-in altitude and the air cut-out altitude the air-proportioning valve opens less and less during inhalation periods and the oxygen-proportioning valve opens more and more until the air cut-out altitude is reached at which the air-proportioning valve is held closed. For altitudes higher than the air cut-out altitude only the oxygen-proportioning valve opens.

The incoming oxygen may be at a pressure of anywhere from 50 to 500 p. s. i., or even higher. In the first-stage chamber $S_1$ it is reduced to a pressure of say, 8 p. s. i. The outer side of the diaphragm 17 of the second-stage oxygen chamber $S_2$ is exposed to atmospheric pressure, and valve mechanism controlled by this diaphragm is designed to maintain the pressure of the oxygen in the second-stage chamber at approximately atmospheric pressure at all times, i. e., no matter what the altitude happens to be the pressure of the oxygen in the second stage chamber is approximately equal to the atmospheric pressure at that particular altitude. Thus at any altitude inhalation will reduce the pressure in the mixing chamber M slightly below the atmospheric pressure at that altitude and will draw into the mixing chamber either pure air, if the altitude is below the oxygen cut-in altitude, or a mixture of air and oxygen if the altitude is between the oxygen cut-in altitude and the air cut-out altitude, or pure oxygen, if the altitude is above the air cut-out altitude.

At the left side of the regulator casing as viewed in Fig. 1 there is a cover 27 attached to the diaphragm clamping ring 18 so as to leave a gap 28 between the two to expose the diaphragm 17 to atmospheric pressure. The cover 27 not only covers and protects the diaphragm but it houses the diluter cut-out mechanism which is operable by a handle 29 from outside of the casing to apply spring-loading to the outer face of the diaphragm, as hereinafter described, whenever it is desired to supply oxygen to the mixing chamber at a pressure such that only oxygen undiluted with air will be breathed from the mixing chamber. Even under these conditions the regulator continues to operate on the demand principle, i. e., oxygen will be supplied only during inhalation periods, the supply of oxygen being cut off by the amount of pressure built up in the mixing chamber upon exhalation. This supply of pure oxygen which may be effected at any altitude by actuating the diluter cut-out must not be confused with an emergency oxygen supply which can be obtained by opening the emergency by-pass valve 21 which by-passes oxygen at high pressure directly from the inlet 19 into the mixing chamber M through a passage 30.

Figs. 2–22, inclusive, illustrate in detail the oxygen regulator as actually used.

The first-stage pressure reducing mechanism is illustrated in detail in Figs. 2–5, inclusive. Referring first to Fig. 2 which shows the portion of the regulator casing which houses the first-stage oxygen chamber removed from the rest of the casing, it will be seen that oxygen entering through the inlet 19, and after passing through the screen 22, then passes through a nozzle member 31 set in the cylindrical wall of the casing section 14. The nozzle member has formed on it a nozzle having an annular lip 32 on which a valve element 33 seats. The valve element is carried in an opening in a strip 34 of spring metal which is secured at its ends to the regulator casing as shown at 35 and 36 in Fig. 3. A thrust pin 37 bears at one end against the valve element 33 and at its other end against one arm 38a of a bell-crank lever 38 (Fig. 2). The other arm 38b of the bell-crank lever contacts with a metal disc 39 cemented or otherwise secured to the inner side of the first-stage diaphragm 15. The arm 38b of the bell-crank lever is biased outwardly by a closure spring 40 which, as best shown in Figs. 3 and 4, is an outwardly bowed strip of spring metal spanning the oxygen chamber along one of its diameters and bearing at its ends against the inner wall 14' of the casing section 14.

The first-stage diaphragm 15 is clamped to the casing section 14 by the clamping ring 16 bolted to the casing section by means of bolts 41 (see also Fig. 4). Between the diaphragm and the clamping ring there is clamped a disc 42 which is shown by itself in perspective in Fig. 5. The disc is made of spring sheet metal and has a continuous rim portion 43 provided with openings 44 to receive the bolts 41, and a series of inwardly extending spring fingers 45. The fingers are formed by a plurality of slits 46 in the disc which extend from a central zone of the disc radially outward to the continuous rim 43. The spring fingers slope inwardly, as best shown in Figs. 2 and 4, and bear at their inner ends against a metal disc 47 cemented or otherwise secured to the outer side of the diaphragm 15. Thus the fingers 45 constitute cantilever spring fingers which tend to press the diaphragm 15 inwardly against the arm 38b of the bell-crank lever 38. Whenever the pressure in the chamber $S_1$ is low enough the inner ends of the cantilever spring fingers overcome the valve closing effort of the closure spring 40 and function to open the valve element 33 by swinging the bell-crank lever 38 in a counterclockwise direction as viewed in Fig. 2 and thereby moving the thrust pin 37 downwardly. Oxygen may then discharge into the chamber $S_1$ past the valve element 33 until the pressure of the oxygen in the chamber moves the diaphragm outwardly against the action of the cantilever spring fingers and allows the closure spring 46 to close the valve. The oxygen pressure maintained in the chamber $S_1$ is determined by the reaction of the cantilever spring fingers against the outer side of the diaphragm. The disc with its cantilever spring fingers is so designed that when it is assembled in the regulator the spring fingers will have the proper reaction against the diaphragm to cause the chamber $S_1$ to remain filled with oxygen at a predetermined pressure, say 8 p. s. i., as previously stated.

To insure greater stability of valve action there is secured to a side face of the bell-crank lever 38 a spring finger 48 the free end of which bears against one side of a boss 49 projecting outwardly from the inner wall 14' of the casing section 14 (Figs. 2 and 3). The spring finger moves with a predetermined amount of friction against the face of the boss and thereby stabilizes the valve action. If greater stability is desired, a second spring finger may be attached to the opposite side of the bell-crank lever and bear at its end against a second boss to provide even greater frictional opposition to the movement of the bell-crank lever.

Among the important features of the first-stage mechanism are the cantilever spring fingers 45 and the alignment spring 34 which carries and guides the oxygen valve element 33. Since the disc having the cantilever spring fingers is disposed generally parallel to and closely adjacent the diaphragm, the spring fingers occupy very little space beside the diaphragm and therefore the use of the cantilever spring fingers makes it possible to obtain the desired kind of spring-loading against the outer face of the diaphragm in a very limited space. The alignment spring 34 insures accurate alignment of the valve element 33 with the annular lip 32 of the nozzle. It flexibly permits accommodation of the valve element when it is presented to the nozzle lip by the thrust pin 37 and yet it possesses sufficient longitudinal and lateral stiffness to cause the presentation of the valve element to the nozzle lip to be repeatedly identical. This means that such troubles as "double impressions" in the face of the valve element will be avoided.

The second-stage pressure reducing mechanism is illustrated in detail in Figs. 6–10, inclusive. As previously stated the second-stage diaphragm 17 is clamped to the casing section 10 by the clamping ring 18. The clamping ring is attached to the casing by screws 18' which pass through the clamping ring and into bosses 18'' on the inner wall of the casing section 10. Oxygen leaves the first-stage oxygen chamber $S_1$ through an opening 50 (Fig. 3) in the inner wall 14' of the casing section 14, and then crosses to the opposite side of the regulator casing through the passage 23 that was described in connection with the diagrammatic showing in Fig. 1. As will be seen from Fig. 7 this passage is formed in a boss or thickened portion 51 of the cylindrical wall of the intermediate casing section 10. At the outlet end of this passage there is a nozzle member 52 having a nozzle provided with an annular lip 53. When the hereinafter described valve that cooperates with the nozzle lip 53 is opened, oxygen is discharged by the nozzle into the second-stage oxygen chamber $S_2$ which, as above described, lies to the left of the partition 11 in Fig. 1 but lies above the partition 11 in Fig. 7 because of the way this figure is oriented. The valve element that cooperates with the annular lip 53 of the nozzle is shown at 54. This valve element and the nozzle lip constitutes the so-called demand valve. The face of the valve element that contacts with the nozzle lip is coated with a thin film of synthetic rubber shown at 55. The valve element has a hollow neck portion 56 that fits in a collar in an alignment spring shown by itself in Fig. 10. The alignment spring is made from spring sheet metal and is preferably shaped like a hollow triangle having a base portion 57 and two spring arms 58 which converge toward a valve-receiving portion 59 provided with the above-mentioned collar, designated 60, that receives the neck of the valve element. A bracket member 61 has a portion 62 (Fig. 6) that lies over the base portion 57 of the valve alignment spring. The portion 62 of the bracket as well as the underlying portion 57 of the valve alignment spring are clamped to the outer face of the partition 11 by means of screws 63. The member which operatively connects the valve element 54 with the second-stage diaphragm 17 is a lever fulcrumed intermediate its ends to the bracket 61.

The long arm of this lever is a strip 64 of light sheet metal which is channel-shape in cross-section to give it the necessary rigidity. At its diaphragm end, the lever arm 64 is connected to the center portion of a diaphragm plate which, for the sake of lightness, is preferably in the form of a ring 65 having spokes 66 (Fig. 6). The end of the lever arm 64 is connected to the diaphragm plate at the region where the spokes 66 intersect. The rim and spokes are preferably made of thin sheet metal and are channel-shape in cross-section, as shown in Fig. 7, to give them the necessary rigidity.

The short arm of the valve-actuating lever comprises an extension 67 on the sheet metal strip 64 which projects over the valve element 54 (Fig. 6) and to the underside of which there is riveted a relatively massive casting 68 (Fig. 7). This casting serves as a counterweight to balance the long arm of the lever as well as the diaphragm plate. The casting 68 projects laterally beyond the two side edges of the part 67 of the sheet metal strip as shown in Fig. 6 and these projecting portions of the casting are pivoted to the bracket 61 by pins 69.

The short arm of the valve-actuating lever carries a thrust pin 70 (Figs. 7 and 9) which projects into the hollow neck 56 of the valve element 54 and is adapted to bear at its end on the upper surface of the valve element within the neck. The hollow neck of the valve element is closed by a cover plate 71 which has a T-shaped slot 72 in it as shown in Fig. 9a. The head of the T-shaped slot is relatively long as shown at 72a, and its stem portion is relatively short as shown at 72b. The lower end of the thrust pin has a head 73 which is elongated laterally as show in Fig. 9 but is relatively narrow in a transverse direction as shown in Fig. 7. In assembling the valve element on the valve-actuating lever the head of the thrust pin is inserted through the long portion 72a of the slot (Fig. 9a) and then the valve element is moved outwardly a slight distance so that the neck portion of the thrust pin then occupies the portion 72b of the T-shaped slot and so that the shoulders on the head of the thrust pin engage behind solid portions of the cover plate 71 as shown by the dotted-line position of the head 73 in Fig. 9a. The valve element is closed by the thrust action of the pin against it, but when the pin moves away from the valve element there is slight play between the head of the pin and the plate 71 on the valve element. Any movement of the thrust pin away from the valve element beyond that which takes up the play between the head of the pin and the plate 71 brings the head of the pin into contact with the plate and thus causes the valve-actuating lever to positively move the valve element away from the nozzle lip 53. This insures a positive stripping action of the valve element in the event that it happens to freeze to the nozzle lip.

The bracket 61 is provided with an extension 74 having a circular opening which fits over a cylindrical neck 75 on the nozzle member 52 just below the annular lip 53. This insures a predetermined optimum relationship between the lever fulcrum and the nozzle when the bracket is fastened to the partition 11 with the portion 74 encircling the neck of the nozzle and also insures accurate alignment of the thrust pin 70 with the nozzle axis. Moreover, the alignment spring for the valve element (shown in Fig. 10), being fastened to the partition 11 by the same screws that fasten the bracket 61 in place, causes precision alignment between the valve element and the nozzle lip.

The valve element 54 may be replaced whenever desired merely by removing the screws 63, shifting the valve element far enough to permit the head on the thrust pin 70 to move through the elongated portion 72a of the slot in the plate 71 and thereby release the valve element from the valve-actuating lever, and then withdrawing the alignment spring and pushing the valve element out of its collar.

The valve element 54 is biased toward the nozzle lip by the coil spring 76 shown in Figs. 6 and 8. One end of this spring is attached at 77 to the casting 68 forming part of the fulcrumed valve-actuating lever (Fig. 8), and its other end is eccentrically attached to a plug 78 rotatably mounted in the wall of the regulator casing. The outer end of the plug is recessed as shown at 79 to receive the end of a suitable tool by means of which the plug can be turned. Access to the recess 79 is through the central opening of a bushing 80 threaded into the wall of the regulator casing and which assists in rotatably mounting the plug in the casing wall. By turning the plug 78, the tension of the spring on the short arm of the valve-actuating lever may be varied to adjust the thrust of the pin 70 against the valve element. The amount of suction required to open the demand valve and, to some extent, the oxygen concentrations of the regulator, may thus be adjusted, and the adjustment may be made from outside of the regulator without dismantling the regulator. After the demand valve is properly adjusted the rotatable stud 78 may be sealed against tampering by means of wax or other suitable substance introduced into the cavity of the bushing 80.

As stated above, the diaphragm 17 is exposed on its outer face to atmospheric pressure by reason of the gap 28 between the cover plate 27 and the diaphragm clamping ring 18. A supply of oxygen will therefore be maintained in the second-stage chamber $S_2$ substantially at atmospheric pressure at all times, i. e. at the atmospheric pressure prevailing at the flight altitude.

Among the important features of the second-stage mechanism are the particular construction of the demand valve, the way it is associated with and actuated by the valve-actuating lever, the alignment spring for the valve element, the fulcrum bracket with its nozzle-engaging collar, and the means for adjusting the spring tension on the valve element.

Referring again to Fig. 1 it will be recalled that oxygen passes from the second-stage chambers $S_2$ to the mixing chamber M through a port 24 controlled by the oxygen-proportioning valve O. The portion of the regulator casing containing the mixing chamber is shown in Fig. 11. In this figure the mixing chamber is seen as it appears when viewed through the partition 12 in Fig. 1 (carried by the intermediate casing section 10 and which is preferably transparent for the purpose hereinafter described) when the casing section 14 containing the first-stage chamber is removed from the rest of the regulator casing. The important feature of the mixing chamber is the construction and operation of the oxygen-proportioning and air-proportioning valves and their associated mechanism including the aneroid control.

Referring to Fig. 11, the back wall of the mixing chamber appearing in this figure is the partition 11 in Fig. 1. The second-stage oxygen chamber therefore lies at the far side of the wall 11 as viewed in Fig. 11. The partition 11 has a hollow boss-like portion 81 which, in Fig. 11, projects toward the reader. This boss is completely enclosed except for its far side, as viewed in this figure, which is in open communication with the second-stage oxygen chamber $S_2$. Oxygen enters the mixing chamber from the second-stage chamber through a port 82 in the side wall of the hollow boss 81. The amount of oxygen entering the mixing chamber through the port is controlled by the oxygen-proportioning valve O, which may be a thin disc of mica or the like cooperating with an annular lip 83. Air enters the mixing chamber through a hollow boss 84 which is similar to the boss 81 except that the open side of the boss faces the reader in Fig. 11. The partition 12 has an opening which registers with the open side of the boss 84. The casing section 14 shown in Fig. 2 fits over the casing section 10 shown in Fig. 11 so that the inner wall 14' of the casing section 14 lies adjacent to the transparent partition 12 on the intermediate casing section 10. However, the inner wall 14' of the casing section 14 is so shaped that there is an air space between it and the transparent partition 12. Outside air enters this space through a number of openings in the cylindrical wall of casing section 14. One of these openings appears at 85 in Fig. 2. The air then passes through a filtering screen shown at 86 in Fig. 2, as indicated by the arrows in this figure, and then enters the hollow boss 84 through the opening in the transparent partition 12, as indicated by the arrows in Fig. 11. Air enters the mixing chamber M from the boss 84 through a port 87 in the side wall of the boss which is controlled by the air-proportioning valve A. This valve, like the oxygen-proportioning valve, may be in the nature of a thin disc of mica or the like cooperating with an annular lip 88.

The air-proportioning valve A is mounted at the end of a sheet metal lever 89 fulcrumed intermediate its ends on a pin 90. The oxygen-proportioning valve O is mounted at the end of a sheet metal lever 91 fulcrumed intermediate its ends preferably on the same pin 90 on which the air valve lever 89 is fulcrumed. The oxygen valve lever 91 is shaped like a bell crank to bring a pin 92 at the end of the lever and a similar pin 93 carried at the end of the air valve lever substantially on diametrically opposite sides of the fulcrum pin 90. The principal function of the pins 92 and 93 and the reason for positioning them as just described will hereinafter appear.

The two valve levers are made of sheet metal and have substantial width measured in the direction of the fulcrum pin 90, as will appear from Fig. 13. The common fulcrum necessitates a nesting arrangement of the levers, i. e., interpenetration of parts of one with parts of the other, but the levers are so formed that they nevertheless have the required strength or rigidity.

The oxygen-proportioning valve O is biased to closed position by a coil spring 94 (Fig. 11) connected at one end to a portion of the pin 92 and eccentrically connected at its other end to a bushing 95 rotatably mounted in the bottom wall 11 of the mixing chamber. By turning the bushing 95 by means of a suitable tool the spring tension on the oxygen valve lever can be adjusted.

Another coil spring 96 biases the air-proportioning valve A to closed position. However, in this case the coil spring is not connected directly to the valve lever. It is connected at one end to the extending part 97 of a coil spring that encircles a portion of the pin 93 as shown at 98 in Fig. 13. The portion 97 of this spring bears against the fulcrum pin 90, and at its extreme end is loosely connected to the coil spring 96 (Fig. 11). The spring part 97 is relatively stiff and pivots on the fulcrum pin 90 so that the spring 96 acting through the spring part 97 pivoting on the pin 90 tends to swing the pin 93 in a counterclockwise direction as viewed in Fig. 11 and thereby close the air-proportioning valve A. The spring rate of the coil spring 96 is quite low so that the increase in closing force as the air valve opens is small. But the end portion of the spring part 97 is bent at an angle as shown in Fig. 11 to bring the point of attachment of the coil spring 96 to the extremity of the spring part 97 considerably to the left of a perpendicular line from the fulcrum pin 90 to the coil spring 96. Therefore, as the air valve opens, the length of the lever arm from the coil spring 96 to the fulcrum pin 90 is rapidly reduced. This causes the closing torque delivered to the air valve lever to decrease appreciably as the air valve opens, which improves the flow regulation. Moreover, the force exerted by the spring part 97 against the fulcrum pin 90 of the valve levers helps to hold the fulcrum pin fixed in its bearings.

The other end of the coil spring 96 is eccentrically fastened to a bushing 99, similar to the bushing 95, rotatably mounted in the bottom wall 11 of the mixing chamber. By rotating this bushing with a suitable tool the closing force of the coil spring 96 on the air valve may be adjusted.

It will now be seen that the air-proportioning valve and the oxygen-proportioning valve are in the nature of check valves, i. e., they are spring-biased to closed position but will open when there is sufficient suction in the mixing chamber. The degree of opening of each valve for a given flight altitude depends upon the demand rate, i. e., upon the amount of suction produced in the mixing chamber during inhalation periods. With light breathing, the valves will open only slightly, but with heavy breathing the valve displacements will be considerable. Thus the valves are elastically responsive to the suction in the mixing chamber. But regardless of whether the breathing is light or heavy, the ratio of displacement of the two valves is determined by the mechanism now to be described.

Referring to Figs. 12–14 it will be seen that the pins 92 and 93 on the two valve levers extend beyond the valve levers and project through slots or openings 100' in upper and lower parallel plates 100 and 101 which are fastened to the upper and lower faces respectively of several lugs 102 which project inwardly from the cylindrical side wall of the casing section 10 that houses the mixing chamber. As best shown in Fig. 14, these plates project inwardly beyond the lugs 102 far enough to provide a free space between the projecting portions of the two plates. The extended portions of the pins 92 and 93 pass transversely through this space. Mounted to move within the space between the plates 100 and 101 is a rocker arm 103, one end of which is pivotally connected to the end portion of the pin 93 on the air valve lever, and the other end of which has a one-way connection with the pin 92 on the oxygen valve lever. That is, this end of the rocker arm 103 is so shaped that it abuts against the pin 92 and will move it to the left, as viewed in Fig. 12, when the corresponding end of the rocker arm is moved to the left, but the pin 92 can move to the left independently of the rocker arm.

One end of a lever 104, herein called the altitude lever, is pivoted at 105 to a bracket within the mixing chamber (Fig. 11) and its other end extends into the space between the plates 100 and 101 (Figs. 12 and 14). This end of the altitude lever is bifurcated, and located between the two arms of the bifurcation is a ball 106. The ball acts as a fulcrum for the rocker arm 103.

The altitude lever 104 is shifted about its pivot 105 by the aneroid bellows 26 (Figs. 11 and 12). When the aneroid bellows expands it swings the altitude lever about its pivot in opposition to a coil spring 108, and when the aneroid bellows contracts the coil spring moves the altitude lever in the opposite direction. Thus the position of the altitude lever is determined by the altitude. In order to compensate for varying spring rates of different aneroid bellows used in the manufacture of the regulator, a row of holes 108' (Fig. 11) is provided in the altitude lever and a similar row 108" in the abutment 104' against which the spring 108 reacts. The ends of the spring can thus be inserted in the proper pair of holes at assembly to insure that the altitude lever response will be a correct function of the altitude change. Movement of the end of the altitude lever rolls the ball 106 along the length of the rocker arm 103 and thereby shifts the fulcrum point of the rocker arm. The ball reacts against the inner face of a flange 109 extending downwardly from the edge of the top plate 100 as shown in Fig. 14. Since the ball 106 has limited freedom of movement relative to the altitude lever in the lengthwise direction of the lever, it is not necessary that the center of curvature of the rocker arm 103 coincide exactly with the pivot 105 of the altitude lever.

Assuming the end of the altitude lever 104 to be at some intermediate position along the rocker arm 103, say in the mid position shown in Fig. 12, then when the air-proportioning valve A opens during inhalation periods due to the reduction in pressure in the mixing chamber, the end of the air valve lever and its pin 93 will swing in a clockwise direction as viewed in Fig. 12 about the fulcrum pin 90. That end of the rocker arm 103 which is connected to the pin 93 will likewise swing in a clockwise direction. The other end of the rocker arm, in swinging to the left (in Fig. 12), will carry the pin 92 on the oxygen valve lever along with it, thus swinging the oxygen valve lever about the fulcrum pin 90 in a direction to open the oxygen-proportioning valve O. Movement of the air-proportioning valve thus automatically effects a movement of the oxygen-proportioning valve through the mechanical linkage above described. The degree of opening of each valve will depend upon the amount of suction in the mixing chamber, as previously stated, but the ratio of opening of the two valves, i. e., the amount the oxygen valve opens in relation to the amount the air valve opens, will depend upon the position of the end of the altitude lever 104 along the rocker arm.

The nesting of the two valve levers and the use of a common fulcrum pin on opposite sides of which the pins 92 and 93 are located not only results in a compact structure but it causes the arcs through which the pins 92 and 93 move to be not greatly different from the arcs through which the ends of the rocker arm 103 move. This means that there will be a minimum of wear between the rocker arm and the pins.

The end of the aneroid bellows 26 acts on the head of an adjustable screw 110 carried by the altitude lever and which is so adjusted that for altitudes up to the oxygen cut-in altitude, say 5,000 feet, the aneroid bellows has not yet expanded sufficiently to come in contact with the head of the adjusting screw and hence the altitude lever remains in a position in which the ball 106 is about opposite the pin 92 on the oxygen valve lever. Therefore, up to the oxygen cut-in altitude no movement is imparted to the oxygen-proportioning valve when the air-proportioning valve opens because the rocker arm 103 will then fulcrum about a point substantially coinciding with the pin 92 and no movement will be imparted to this pin by the fulcruming of the rocker arm. It is true that because of the one-way connection between the pin 92 and the rocker arm 93 the oxygen-proportioning valve is free to open of its own accord by suction and is not restrained from doing so by the rocker arm; but the coil springs 94 and 96 biasing the two valves to closed position are so adjusted that it requires more suction in the mixing chamber to open the oxygen-proportioning valve than the air-proportioning valve. Therefore, the air-proportioning valve will open and the oxygen-proportioning valve will remain closed and air only will be delivered to the breathing mask for altitudes up to the oxygen cut-in altitude.

At the air cut-out altitude, say 33,000 feet, the end of the altitude lever will have been moved by the aneroid bellows so that the ball 106 lies substantially opposite pin 93 on the air valve lever. Therefore, at this and higher altitudes the pin 93 is locked against movement to the right (in Fig. 12) and the air-proportioning valve cannot open. However, the oxygen-proportioning valve will be opened by the suction in the mixing chamber, this being permitted because the pin 92 at the end of the oxygen valve lever is free to move to the left (in Fig. 12) as previously described. Therefore, at the air cut-out altitude, and at higher altitudes, pure oxygen undiluted with air will be drawn by the aviator to the breathing mask from the oxygen regulator. For intermediate altitudes, i. e. altitudes between the oxygen cut-in altitude and the air cut-out altitude, the aneroid-controlled interlinkage between the air-proportioning and oxygen-proportioning valves functions to cause the displacement of the air-proportioning valve to become gradually less and the displacements of the oxygen-proportioning valve to become gradually greater as the flight altitude increases between the oxygen cut-in altitude and the air cut-out altitude. The manner in which this mechanism functions is simply depicted in Fig. 15. The aneroid bellows moves the altitude lever so that the position of the end of the altitude lever along the rocker arm changes in accordance with changes in the flight altitude between the oxygen cut-in altitude and the air cut-out altitude. In other words, if $a$ is the position of the end of the altitude lever at the oxygen cut-in altitude, and $b$ is its position at the air cut-out altitude, then for any intermediate position of the end of the altitude lever the ratio of the distances from the end of the altitude lever to the opposite ends of the rocker arm, i. e. the ratio $x/y$ equals the ratio of the barometric pressure difference between the oxygen cut-in and flight altitudes to the barometric pressure difference between the air cut-out and flight altitudes. The latter ratio may for convenience be called the "flight-deviation ratio." If it be assumed that the air valve lever and the oxygen valve lever are pivoted in the same manner so that the length of the lever arms of one valve lever have the same relationship as those of the other valve lever, then the displacement ratio of the air-proportioning and oxygen-proportioning valves would equal the flight-deviation ratio for any flight altitude between the oxygen cut-in altitude and the air cut-out altitude. But it is desirable that the displacement ratio of the two valves be determined, not by the flight-deviation ratio alone, but also by a so-called "amplification factor." This is obtained by fulcruming the valve levers in such a way that the length of the lever arm $a'$ from the fulcrum to the rocker-actuating end of the air valve lever is shorter than the length of the corresponding lever arm $o'$ of the oxygen valve lever, as clearly shown in Fig. 15. The desirable amplification factor is about 3.18, so the lever arms of the air and oxygen valve levers are given such lengths that when the end of the altitude lever is at mid position along the length of the rocker arm 103, the air valve displacements will be 3.18 times as great as the oxygen valve displacements. Under these circumstances the oxygen valve displacements will not become as great as the air valve displacements until the end of the altitude lever has accomplished about 86% of its stroke along the rocker arm toward the $b$ position, whereas without the amplification factor the oxygen valve displacements would be equal to the air valve displacements when the end of the altitude lever reached its mid position along the length of the rocker arm. The amplification factor causes the rate at which the air supply is decreased, as the flight altitude increases, to be several times the rate at which the oxygen supply increases and this is desirable because of the relatively small volume of oxygen in the inducted air (21%) and because of the effect of barometric pressure on the discharge rate of a gas through any given orifice, which effect causes more oxygen to discharge through a given size orifice at lower barometric pressure than at higher ones.

It will now be seen that even though each of the valves O and A acts like a check valve and is suction-opened against the force of its closing spring an amount which depends, at a given flight altitude, on the suction in the mixing chamber, the above-described aneroid-controlled interlinkage between the valves causes their displacements to be relatively such that the air-proportioning valve will open less and less and the oxygen-proportioning valve will open more and more as the flight altitude increases from the oxygen cut-in altitude to the air cut-out altitude. Any opening of the air-proportioning valve will force an opening of the oxygen-proportioning valve so that the air breathed by the aviator will have the proper oxygen enrichment. The displacement ratio of the two valves is determined by the flight deviation ratio, as above defined, and preferably also by the above-described amplification factor which causes the rate at which the air supply is decreased with increasing flight altitude to be several times the rate at which the oxygen supply is increased. Up to the oxygen cut-in altitude only the air-proportioning valve opens, as above described, and at the air cut-out altitude, and at higher altitudes, only the oxygen-proportioning valve opens.

Since the air-proportioning and oxygen-proportioning valves are elastically responsive to the suction in the mixing chamber the above-mentioned limitations imposed on a regulator in which the air and oxygen-proportioning valves have a fixed degree of opening for every altitude between the oxygen cut-in altitude and the air cut-out altitude are avoided. An additional advantage of having the oxygen-proportioning valve function like a check valve is that it avoids any possibility of damaging the second-stage diaphragm in the event that the regulator outlet is obstructed when the emergency by-pass valve for the oxygen is opened.

The gas withdrawn from the mixing chamber by the aviator passes through a filtering screen 118' on its way to the outlet connection 13 (Fig. 11).

Any excessively high pressures in the mixing chamber will be relieved through the operation of a relief valve 84' (Fig. 11). Gas enters this valve from the mixing chamber by way of a passage 84" and is discharged to atmosphere through the air boss 84 and the above described passages by which incoming air is conducted to this boss.

If at any time the aviator desires to breathe pure oxygen regardless of the altitude, he may actuate the diluter cut-out mechanism, the details of which are illustrated in Figs. 16–22 inclusive. As above described in connection with Fig. 1, this mechanism is actuated by moving a handle 29 at the outer side of the end cover 27 which lies over the second-stage diaphragm 17. In Fig. 16 the oxygen regulator is shown as it appears when looking directly toward the cover plate 27. The cover 27 has an arc-shaped opening 111 in which a neck portion on the handle 29 operates. The handle 29 is secured to a cam ring 112 which is shown in perspective in Fig. 19 removed from the regulator casing. This cam ring fits into and is guided by the previously described ring 18 which clamps the second-stage diaphragm 17 to the regulator casing. As best shown in Fig. 20 the upper inner corner of the clamping ring 18 is cut away to form an annular recess 113 in which the cam ring 112 is received and guided. The outer edge of the cam ring 112 has cut out portions 114 (Fig. 19) to clear posts or bosses 115 on the diaphragm clamping ring 18 (Fig. 20). These bosses receive the screws 116 (Fig. 16) by which the cover plate 27 is attached to the regulator, and also serve to space the cover plate away from the clamping ring to provide the above-mentioned air gap 28 as best shown in Fig. 7. Thus the cam ring 112 can be turned in its annular seat in the diaphragm clamping ring 18 through about 45° by moving the handle 29 back and forth between the full-line and broken-line positions shown in Fig. 16.

Within the space between the cover plate 27 and the second-stage diaphragm 17 there is also positioned a plate 117 (Fig. 21). This plate is shown removed from the regulator casing in Fig. 19. As shown in this figure a spring spider 118 is riveted at its center to the center of the plate 117. The spider has four spring fingers 119 which extend radially outward and also in the direction of the under surface of the end cover 27. The ends of these fingers react against the inner surface of the cover plate 27. The ends of the spring fingers engage in recesses or guides cast in the inner surface of the cover plate 27 near its periphery. One of these recesses appears at 120 in Fig. 22 and the four of them are shown in dotted lines in Fig. 16. The spring fingers tend to move plate 117 toward and into engagement with the second-stage diaphragm 17 but are normally prevented from doing so when the handle 29 is in the position shown in Fig. 16 by four V-shaped cam projections 121 at the inner edge of the cam ring 112 (Fig. 19). There is one of these cam projections for each of the spring fingers 119. Each cam projection slopes upwardly in a direction circumferentially of the cam ring from the plane of the cam ring itself to the high point of the cam at the point of the V-shaped projection. When the handle 29 is in the position shown in Fig. 16 the high portions of the cam projections 121 bear against the spring fingers 119 at their sides which face the diaphragm 17. Therefore, the cam projections normally flex the spring fingers back toward the end cover 27 and keep the plate 117 out of contact with the second-stage diaphragm 17. This position of the parts is represented in Fig. 21. It is also represented in Fig. 17 which is a view looking into the regulator with the cover plate 27 removed. The position of the handle 29, in which the plate 117 is kept out of contact with the second-stage diaphragm by the cam projections on the ring, is the "Normal oxygen" position of the handle, as indicated in Fig. 16. The regulator then functions as previously described to automatically dilute the oxygen with air in accordance with the flight altitude for altitudes between the oxygen cut-in altitude and the air cut-out altitude. When the handle 29 is moved to the position marked "Pure oxygen" in Fig. 16 the cam ring is turned through about 45° to the position shown in Fig. 18. The spring fingers 119 are prevented from turning with the cam ring by the guides or recesses 120 in which the ends of the spring fingers engage and slide. This removes the high points of the cam projections 121 from their positions behind the spring fingers 119 and allows them to force the plate 117 into contact with the second-stage diaphragm 17, as shown in Fig. 22. The diaphragm being now loaded by the spring fingers 119 is moved inwardly and opens the demand valve 54 to admit additional oxygen to the second-stage oxygen chamber $S_2$. Of course the diaphragm and the pressure plate 117 will move back toward diaphragm lever and close the demand valve when the pressure of the oxygen in the second-stage chamber reaches a predetermined value and overcomes the force of the loading spring fingers 119. In the particular regulator illustrated in the drawings this pressure is approximately .25" of water. The oxygen at this pressure will open the oxygen-proportioning valve O and supply oxygen to the mixing chamber. In the regulator illustrated, the oxygen-proportioning valve operates on a pressure differential of approximately .15" of water. Therefore, the pressure of the oxygen admitted to the mixing chamber when the diluter cut-out is in the "Pure oxygen" position, will be .25" minus .15", or .10". This means that whenever the diluter cut-out is in the "Pure oygen" position so as to eliminate automatic dilution of the oxygen with air, the regulator will deliver pure oxygen at a pressure ranging upward to about .10" of water. This pressure will be realized for the lower demand rates, but the design of the diluter cut-out mechanism and the demand valve is such that although the pressure in the second-stage chamber and in the mixing chamber will decrease somewhat at increased demand rates, the pressure in the mixing chamber will nevertheless be adequate if the demand on the regulator does not exceed the maximum for which the regulator is designed.

When positive pressure is maintained in the mixing chamber by reason of the diluter cut-out mechanism being in the "Pure oxygen" position, no air will be drawn through the air-proportioning valve during inhalation periods because pressure on the downstream side of the air-proportioning valve is greater than the pressure on the upstream side.

The regulator illustrated is so designed that even when oxygen is delivered with the diluter cut-out mechanism in the "Pure oxygen" position, it will be delivered in accordance with demand; the rate of discharge of the oxygen will increase with increasing demand rates and the discharge will be totally interrupted during the exhalation phase of the respiratory cycle. The action of the oxygen emergency by-pass valve shown at 20 in Figs. 1 and 2, is quite otherwise. When this valve is opened in emergencies by turning the knob 122 a continuous discharge of oxygen under high pressure takes place from the oxygen inlet 19 through the passage 30 directly into the mixing chamber.

The casing section 14 which houses the first-stage oxygen chamber has three outwardly extending lugs 123 (Fig. 3) spaced approximately 120° apart provided with bolt holes 124. The intermediate casing section 10 which houses the mixing chamber has similar lugs 125 having bolt holes 126 (Fig. 11). In assembling the regulator casing the lugs on the two casing sections are brought into registry and are bolted together by suitable bolts not shown in the drawings. A gasket shown at 127 in Figs. 7 and 11 effects a gas-tight joint at the place where the oxygen leaves the first-stage chamber and enters the passage 23 leading to the second-stage chamber. The clamping ring 18 for the second-stage diaphragm is screwed to the intermediate casing section 10 by screws not shown in the drawings and the cover plate 27 is secured to the clamping ring 18 as previously described. The clamping ring 16 for the first-stage diaphragm is screwed to the casing section 14 housing the first-stage oxygen chamber as descrlbed in connection with Fig. 4. Thus all parts of the casing are combined into one unit. Ordinarily the regulator would have a cover plate attached to the diaphragm clamping ring 16 (Fig. 1) to cover the first-stage diaphragm and the cantilever spring fingers 45, but this cover plate is not shown in the drawings.

The transparent partition 12 between the mixing chamber and the first-stage oxygen chamber (Figs. 1 and 11) is cemented or otherwise secured to the intermediate casing section 10 and remains in position on this section of the casing when the casing section 14 containing the first-stage oxygen chamber is removed. This permits the operation of the mechanism in the mixing chamber to be observed through the transparent partition when the casing section containing the first-stage oxygen chamber is removed and enables the mechanism in the mixing chamber to be readily inspected and tested. For instance, the cut-in point for the oxygen and the cut-out point for the air may be checked at any time merely by draining the pressure in the regulator to the appropriate level and observing the position of the end of the altitude lever with reference to suitable index marks (not shown) which may be inscribed on the upper plate 100 (Fig. 12) under which the end of the altitude lever projects. Moreover, because of the fact that the portion of the casing containing the mixing chamber and the second-stage oxygen chamber with its demand valve can be readily separated from the casing section containing the first-stage oxygen chamber, a new assembly including a recently tested demand valve and mixing chamber can be readily substituted for an old one in the airplane just prior to making a flight.

We claim:

1. In an oxygen regulator for aircraft breathing apparatus, a mixing chamber having an air inlet port and an oxygen inlet port, a suction-opened valve controlling each of said ports, and aneroid-controlled mechanical interconnections between said valves adapted for altitudes within a predetermined range to transmit displacements of the air valve to the oxygen valve to cause the oxygen valve to open when the air valve opens and to vary the displacement ratio of the two valves so that the displacements of the air valve become progressively smaller and those of the oxygen valve become progressively larger as the altitude increases within said range, said connections being further adapted at any given altitude within said range to allow each of said valves to open an amount which is proportional to the suction in the mixing chamber.

2. In an oxygen regulator for aircraft breathing apparatus, a mixing chamber having an air inlet port and an oxygen inlet port, a suction-opened valve controlling each of said ports, control mechanism for said valves comprising a system of articulated levers including a fulcrumed rocker arm and aneroid-operated means for shifting the fulcrum of said rocker arm, said mechanism being adapted for altitudes within a predetermined range to transmit displacements of the air valve to the oxygen valve to cause the oxygen valve to open when the air valve opens and operating by reason of the shifting of the fulcrum of said rocker arm to vary the displacement ratio of the two valves so that the displacements of the air valve become progressively smaller and those of the oxygen valve become progressively larger as the altitude increases within said range, and said control mechanism being further adapted at any given altitude within said range to allow each of said valves to open an amount which is proportional to the suction in the mixing chamber.

3. In an oxygen regulator for aircraft breathing apparatus, a mixing chamber having an air inlet port and an oxygen inlet port, a suction-opened valve controlling each of said ports, a system of articulated levers between said valves including a fulcrumed rocker arm, and aneroid-controlled means for shifting the fulcrum of said rocker arm, whereby for altitudes within a predetermined range displacements of the air valve are transmitted to the oxygen valve to cause the oxygen valve to open when the air valve opens and whereby the displacement ratio of the two valves is varied so that the displacements of the air valve become progressively smaller and those of the oxygen valve become progressively larger as the altitude increases within said range, said levers and said aneroid-controlled means being adapted at any given altitude within said range to allow each of said valves to open an amount which is proportional to the suction in the mixing chamber.

4. In an oxygen regulator for aircraft breathing apparatus, a mixing chamber having an air inlet port and an oxygen inlet port, a suction-opened valve controlling each of said ports, mechanical interconnections between the oxygen valve and the air valve including a fulcrumed rocker arm, a member having a fulcrum for said rocker arm, and an aneroid adapted to vary the position of said member to shift the fulcrum with respect to the rocker arm in accordance with the altitude, whereby up to a predetermined altitude only the air valve opens and at progressively higher altitudes displacements of the air valve are transmitted to the oxygen valve to cause the oxygen valve to open when the air valve opens, the displacement ratio of the two valves being varied as the altitude increases so that the displacements of the air valve become progressively smaller and those of the oxygen valve become progressively larger and so that at still higher altitudes only the oxygen valve opens, said mechanical interconnections being adapted to allow each of said valves, at any altitude at which it is free to open, to open an amount which is proportional to the suction in the mixing chamber.

5. In an oxygen regulator for aircraft breathing apparatus, a mixing chamber having an air inlet port and an oxygen inlet port, a suction-opened valve controlling each of said ports, control mechanism associated with said valves comprising a system of articulated levers including a fulcrumed rocker arm, a member having a fulcrum for said rocker arm, and an aneroid adapted to vary the position of said member to shift the fulcrum of the rocker arm in accordance with the altitude.

6. In an oxygen regulator for aircraft breathing apparatus, a mixing chamber having an air inlet port and an oxygen inlet port, a suction-opened valve controlling each of said ports, mechanism for controlling said valves comprising a system of articulated levers between the valves including a fulcrumed rocker arm, and aneroid-controlled means for shifting the fulcrum of said rocker arm in accordance with the altitude.

7. In an oxygen regulator for aircraft breathing apparatus, a mixing chamber having an air inlet port and an oxygen inlet port, a suction-opened valve controlling each of said ports, a valve lever pivoted intermediate its ends and at one end of which the oxygen valve is mounted, a second valve lever pivoted intermediate its ends and at one end of which the air valve is mounted, a fulcrumed rocker arm operatively connected to the other ends of the valve levers, and aneroid-controlled means for shifting the fulcrum of said rocker arm in accordance with the altitude.

8. In an oxygen regulator for aircraft breathing apparatus, a mixing chamber having an air inlet port and an oxygen inlet port, a suction-opened valve controlling each of said ports, a valve lever pivoted intermediate its ends and at one end of which the oxygen valve is mounted, a second valve lever pivoted intermediate its ends and at one end of which the air valve is mounted, the two valve levers having a common pivot, a fulcrumed rocker arm operatively connected to the other ends of the valve levers, and aneroid-controlled means for shifting fulcrum of said rocker arm in accordance with the altitude.

9. In an oxygen regulator for aircraft breathing apparatus, a mixing chamber having an air inlet port and an oxygen inlet port, a suction-opened valve controlling each of said ports, mechanism for controlling said valves comprising a system of articulated levers including a valve lever connected to each valve and pivoted intermediate its ends and a fulcrumed rocker arm operatively connected to the distal ends of the valve levers, the ratio of the lever arms of one valve lever being different from that of the other valve lever, and aneroid-controlled means for shifting the fulcrum of said rocker arm in accordance with the altitude.

10. In an oxygen regulator, a mixing chamber having an air inlet port and an oxygen inlet port, a suction-opened valve controlling each of said ports, a valve lever for each of said valves pivoted intermediate its ends and at one end of which the valve is mounted, a fulcrumed rocker arm operatively connected to the other ends of the valve levers, and means for shifting the fulcrum of said rocker arm.

11. In an oxygen regulator, a mixing chamber having an air inlet port and an oxygen inlet port, a suction-opened valve controlling each of said ports, a pair of valve levers pivoted intermediate their ends on a common pivot and at one end of each of which one of said valves is mounted, pins carried by the other ends of said levers at substantially diametrically opposite sides of said common pivot, a fulcrumed rocker arm which is operatively connected to said other ends of the valve levers by means of said pins, and means for shifting the fulcrum of said rocker arm.

12. In a gas regulator having a pressure reduction chamber for the gas, a port through which gas is admitted to such chamber, said port having an annular lip, a valve element having an elastic facing cooperating with said lip, and means controlled by the pressure in said chamber including a pivoted lever for actuating the valve element, the combination therewith of guiding means for the valve element having two spring arms rigidly mounted at their outer ends and extending inwardly to the valve element where they are connected thereto and support and guide the valve element independently of said pivoted lever.

13. In a gas regulator having a pressure reduction chamber for the gas, a port through which gas is admitted to such chamber, said port having an annular lip, a valve element having an elastic facing cooperating with said lip, and means including a pivoted lever controlled by the pressure in said chamber for actuating the valve element, the combination therewith of guiding means for the valve element including a sheet metal member having the shape of a hollow triangle, and means for rigidly supporting the base portion of said triangular member, the two arms of the triangular member being inherently resilient and connected at their meeting ends to the valve element so as to support and guide the valve element independently of said pivoted lever.

14. In a gas regulator having a pressure reduction chamber for the gas, a port through which gas is admitted to said chamber, said port having a lip, a valve having an elastic facing cooperating with said lip and having a cylindrical portion, and means including a pivoted lever controlled by the pressure in said chamber for actuating the valve, the combination therewith of guiding means for the valve including a sheet metal member having the shape of a hollow triangle, and means for rigidly supporting the base portion of said triangular member, the two arms of the triangular member being inherently resilient and connected at their meeting ends to an annular ring, and said cylindrical portion of the valve being mounted in said annular ring whereby the valve is supported and guided by the arms of the triangular member independently of said pivoted lever.

15. In a gas regulator, a pressure reduction chamber for the gas, a diaphragm forming a wall of said chamber, a valve mechanism operatively connected to the diaphragm for controlling the admission of gas to said chamber, said valve mechanism comprising a nozzle through which gas is admitted to said chamber and having an annular lip, a valve element cooperating with said lip, the nozzle having a cylindrical neck portion below the lip, a bracket member having a circular opening fitting said cylindrical neck portion of the nozzle, and a member fulcrumed on said bracket and operatively connecting the valve element to the diaphragm.

16. In a gas regulator, a casing, a pressure reduction chamber in said casing, a diaphragm forming a wall of said chamber, valve mechanism operatively connected to the diaphragm for controlling the admission of gas to said chamber, said valve mechanism comprising a nozzle through which gas is admitted to said chamber and having an annular lip, a valve element cooperating with said lip, the nozzle having a cylindrical neck portion below the lip, a bracket member having a collar fitting the cylindrical neck portion of the nozzle and also a portion which is fastened to the regulator casing, and a member fulcrumed on said bracket member and operatively connecting the valve element to the diaphragm.

17. In a gas regulator, a casing, a pressure reduction chamber in said casing, a diaphragm forming a wall of said chamber, valve mechanism operatively connected to the diaphragm for controlling the admission of gas to said chamber, said valve mechanism comprising a nozzle through which gas is admitted to said chamber and having an annular lip, a valve element cooperating with said lip and opening in the direction of the gas flow through the nozzle into said chamber, a bracket member fastened to the regulator casing and having a portion engaging a part of said nozzle, a valve-actuating member fulcrumed on said bracket member and operatively connected at one end to the diaphragm, and a thrust pin carried by said valve-actuating member at the opposite side of the fulcrum and adapted to engage the valve element substantially at its center, said bracket member on which the valve-actuating member is fulcrumed serving to maintain said thrust pin centered with respect to said nozzle.

18. In a gas regulator, a casing, a pressure reduction chamber in said casing, a diaphragm forming a wall of said chamber, valve mechanism operatively connected to the diaphragm for controlling the admission of gas to said chamber, said valve mechanism comprising a nozzle through which gas is admitted to said chamber and having an annular lip, a valve element cooperating with said lip and opening in the direction of the gas flow through the nozzle into said chamber, a bracket member fastened to the regulator casing and having a portion engaging a part of said nozzle, a valve-actuating member fulcrumed on said bracket member and operatively connected at one end to the diaphragm, a thrust pin carried by said valve-actuating member at the opposite side of the fulcrum and adapted to engage the valve element substantially at its center, said bracket member on which the valve-actuating member is fulcrumed serving to maintain said thrust pin centered with respect to said nozzle, and means for guiding the valve element and maintaining it centered with respect to the nozzle axis.

19. In a gas regulator, a casing, a pressure reduction chamber in said casing, a diaphragm forming a wall of said chamber, valve mechanism operatively connected to the diaphragm for controlling the admission of gas to said chamber, said valve mechanism comprising a nozzle through which gas is admitted to said chamber and having an annular lip, a valve element cooperating with said lip and opening in the direction of the gas flow through the nozzle into said chamber, a bracket member fastened to the regulator casing and having a portion engaging a part of said nozzle, a valve-actuating member fulcrumed on said bracket member and operatively connected at one end to the diaphragm, a thrust pin carried by said valve-actuating member at the opposite side of the fulcrum and adapted to engage the valve element substantially at its center, said bracket member on which the valve-actuating member is fulcrumed serving to maintain said thrust pin centered with respect to said nozzle, and guiding means for the valve element having two spring arms rigidly mounted at their outer ends and extending inwardly to the valve element where they are connected thereto to maintain the valve element centered with respect to the nozzle axis and the axis of said thrust pin.

20. In a gas regulator, a casing, a pressure reduction chamber in said casing, a diaphragm forming a wall of said chamber, valve mechanism operatively connected to the diaphragm for controlling the admission of gas to said chamber, said valve mechanism comprising a nozzle through which gas is admitted to said chamber and having an annular lip, a valve element cooperating with said lip and opening in the direction of the gas flow through the nozzle into said chamber, the nozzle having a cylindrical neck portion below the lip, a bracket member having a collar fitting the cylindrical neck portion of the nozzle and also a portion which is bolted to the regulator casing, a valve-actuating member fulcrumed on said bracket member and operatively connected at one end to the diaphragm, a thrust pin carried by said valve-actuating member at the other side of the fulcrum and adapted to engage the valve element substantially at the center thereof, and a member for guiding the valve element having two spring arms extending inwardly to the valve element where they are connected thereto, said valve-guiding member being fastened to the regulator casing by the same bolts that fasten said bracket member to the regulator casing whereby said bracket member and said valve-guiding member maintain said thrust pin and the valve element centered with respect to the nozzle axis.

21. In a gas regulator having a casing, a pressure reduction chamber in said casing, a diaphragm forming a wall of said chamber, valve mechanism within said casing including a valve element operatively connected to the diaphragm for controlling the admission of gas to said chamber, and a coil spring within said casing biasing said valve element toward closed position, the combination therewith of a rotatable member mounted in the wall of the regulator casing and adapted to be rotated from outside the casing, the coil spring within the regulator casing being eccentrically connected to said rotatable member whereby said rotatable member may be rotated from a point outside of the casing to adjust the spring tension on the valve element.

22. In a gas regulator having a casing, a pressure reduction chamber in said casing, a diaphragm forming a wall of said chamber, valve mechanism within said casing and comprising a valve element operatively connected to the diaphragm for controlling the admission of gas to said chamber, and a coil spring within the casing biasing said valve element to closed position, the combination therewith of means for adjusting the tension of said spring on the valve comprising a bushing rotatably mounted in the wall of the regulator casing and eccentrically connected to said spring, and means whereby said bushing may be rotated from the outside of the regulator casing.

23. In a gas regulator having a casing, a pressure reduction chamber in said casing, a diaphragm forming a wall of said chamber, valve mechanism within said casing and comprising a valve element operatively connected to the diaphragm for controlling the admission of gas to said chamber, and a spring within the regulator casing biasing said valve element to closed position, the combination therewith of means connected to said spring and movable to different positions to adjust the tension of said spring on the valve element, said means being movable to its various positions from outside of the regulator casing.

24. In an oxygen regulator, a casing, partitions in the casing dividing the interior of the casing into an intermediate mixing chamber and first and second-stage pressure reduction chambers for the oxygen at opposite sides of the mixing chamber, diaphragm-controlled valve mechanism for admitting high pressure oxygen to the first-stage chamber, diaphragm-controlled valve mechanism for admitting oxygen from the first-stage chamber to the second-stage chamber, an oxygen port for admitting oxygen from the second-stage chamber to the mixing chamber, an air port for admitting air to the mixing chamber, aneroid-controlled air-proportioning and oxygen-proportioning valves controlling said oxygen and air ports, the portion of the regulator casing at one side of the mixing chamber being detachable from the rest of the casing and the partition separating the first-stage chamber within said detachable portion of the casing from the mixing chamber being attached to the casing portion which houses the mixing chamber and being transparent whereby the operation of the parts within the mixing chamber may be observed through the transparent partition when said detachable portion of the casing is removed.

25. In an oxygen regulator, a casing, a portion of said casing forming a mixing chamber through which oxygen is admitted to the mixing chamber, a port through which air is admitted to the mixing chamber, aneroid-controlled air-proportioning and oxygen-proportioning valves controlling said ports, the portion of the regulator casing at one side of the mixing chamber constituting a pressure reduction chamber for the oxygen on its way to said oxygen port, said portion of the casing being detachable from the portion of the casing which houses the mixing chamber, and a transparent partition attached to the portion of the casing which houses the mixing chamber and which separates said pressure reduction chamber from the mixing chamber whereby when said detachable portion of the casing is removed the operation of the parts within the mixing chamber may be observed through said transparent partition.

26. In a gas regulator having a casing, a pressure reduction chamber in said casing, a diaphragm forming a wall of said chamber, a port through which gas is admitted to said chamber, said port having a lip, a valve element cooperating with said lip, and operating connections between said diaphragm and the valve element including a thrust pin engaging the valve element and adapted to press the valve element against said lip when the pressure of the oxygen in said chamber reaches a predetermined value, the combination therewith of a strip of spring metal secured at its opposite ends to the regulator casing and at the intermediate portion of which said valve element is mounted whereby the movement of the valve element toward and away from said lip is guided by said strip of spring metal.

27. In an oxygen regulator having a casing, an oxygen chamber in the casing from which oxygen is inhaled, a diaphragm forming a wall of said chamber and exposed at its outer side to atmospheric pressure, a valve controlling the admission of oxygen to said chamber and operatively connected to the diaphragm so that increase in pressure in said chamber tends to close said valve and decrease in pressure tends to open it, and loading means normally retaining the oxygen admission valve closed but permitting opening of the valve by the diaphragm upon establishment in the oxygen chamber of a pressure on the negative side of atmospheric pressure during inhalation periods, the improvement which comprises normally ineffective means for spring-loading the outside of said diaphragm, said means including a member adjacent the outer face of the diaphragm, a plurality of spring fingers attached to said member and reacting against a part of the regulator casing to bias said member toward the diaphragm, a cam ring rotatably mounted in the regulator casing having cams acting on said spring fingers to normally restrain them from moving said member into contact with the diaphragm, and a member connected to said cam ring and operable from outside of the casing whereby the ring may be turned to cause said cams to release the spring fingers and thereby permit them to press said member against the outer face of the diaphragm.

28. In an oxygen regulator having a casing, an oxygen chamber in the casing from which oxygen is inhaled, a diaphragm forming a wall of said chamber and exposed at its outer side to atmospheric pressure, a valve controlling the admission of oxygen to said chamber and operatively connected to the diaphragm so that increase in pressure in said chamber tends to close said valve and decrease in pressure tends to open it, and loading means normally retaining the oxygen admission valve closed but permitting opening of the valve by the diaphragm upon establishment in the oxygen chamber of a pressure on the negative side of atmospheric pressure during inhalation periods, the improvement which comprises normally ineffective means for spring-loading the outside of said diaphargm, said means including a plate adjacent the outer face of the diaphragm, a plurality of spring fingers attached to the center portion of said plate and radiating outwardly at an angle to the plate, said spring fingers reacting at their distal ends against a part of the regulator casing to bias said plate toward the diaphragm, a cam ring rotatably mounted in the regulator casing having cams acting on said spring fingers to normally restrain them from moving said plate into contact with the diaphragm, and a member connected to said cam ring and operable from outside of the casing whereby the ring may be turned to cause said cams to release the spring fingers and thereby permit them to press said plate against the outer face of the diaphragm.

29. In an oxygen regulator for use with breathing apparatus for supplying oxygen or oxygen diluted with air during inhalation periods, a casing, a mixing chamber in the casing, an oxygen chamber in the casing, a port through which oxygen may be drawn into the mixing chamber from the oxygen chamber during inhalation periods, an air port through which air may be drawn into the mixing chamber during inhalation periods, a suction-opened oxygen-proportioning valve associated with the oxygen port, spring means biasing the oxygen-proportioning valve to closed position, a suction-opened air-proportioning valve associated with the air port, spring means biasing the air-proportioning valve to closed position, a diaphragm forming one wall of said oxygen chamber and exposed at its outer side to atmospheric pressure, an oxygen admission valve controlling the supply of oxygen to said oxygen chamber and operatively connected to the diaphragm so that increase in pressure in the oxygen chamber tends to close said oxygen admission valve and decrease in pressure tends to open it, loading means normally retaining the oxygen admission valve closed but permitting opening of it by the diaphragm upon establishment in the oxygen chamber of a pressure on the negative side of atmospheric pressure during inhalation periods, and diluter cut-out mechanism comprising spring means at the outer side of said diaphragm for loading the diaphragm, means for normally keeping said spring means ineffective but operable to render it effective, said spring means when effective being adapted to load the diaphragm to an extent such that said oxygen admission valve will then supply oxygen to the mixing chamber at a pressure high enough to prevent the reduction in pressure in the mixing chamber during inhalation periods from opening said air-proportioning valve.

30. In an oxygen regulator, a casing, a mixing chamber in the casing, an oxygen chamber in the casing, a port through which oxygen may be drawn into the mixing chamber from the oxygen chamber during inhalation periods, an air port through which air may be drawn into the mixing chamber during inhalation periods, a suction-opened oxygen-proportioning valve associated with the oxygen port, spring means biasing the oxygen-proportioning valve to closed position, means for adjusting the force exerted by said spring means on the oxygen-proportioning valve, a suction-opened air-proportioning valve associated with the air port, spring means biasing the air-proportioning valve to closed position, and means for adjusting the force exerted by said last-named spring means on the air-proportioning valve.

31. In an oxygen regulator, a casing, a mixing chamber in the casing, an oxygen chamber in the casing, a port through which oxygen may be drawn into the mixing chamber from the oxygen chamber during inhalation periods, an air port through which air may be drawn into the mixing chamber during inhalation periods, a suction-opened oxygen-proportioning valve associated with the oxygen port, spring means biasing the oxygen-proportioning valve to closed position, a suction-opened air-proportioning valve associated with the air port, a lever at one end of which the air-proportioning valve is mounted, said air valve lever being pin-fulcrumed intermediate its ends whereby it has a free end beyond the fulcrum pin, and spring means biasing the air-proportioning valve to closed position, said last-named spring means comprising a member bearing against the fulcrum pin of said air valve lever and connected at one end to said free end of the air valve lever, and a coil spring connected to the opposite end of said member to retract the same against said fulcrum pin and thereby bias the free end of the air valve lever in a direction to close the air valve, the point of connection between said member and the coil spring being such that the effective length of the lever-arm from the fulcrum pin to said point of connection grows less as the air valve opens.

32. A gas regulator having a casing, a pressure reduction chamber in said casing, a diaphragm forming a wall of said chamber, a port through which gas is admitted to said chamber, a valve element having a facing of elastic material cooperating with a lip-type seat surrounding said port, a pivoted valve-actuating lever operatively connected to the diaphragm, and a spring strip fixedly held at one portion and carrying the valve element at a free portion and being adapted to guide the valve element independently of said valve-actuating lever toward and away from the seat while restraining it against lateral movement in all directions, a portion of said lever being arranged to exert pressure on the valve element and seat it when the gas pressure in the pressure-reduction chamber acting on the diaphragm increases to a predetermined value.

33. In a gas regulator or the like having a body portion, a diaphragm, and a circular diaphragm